March 19, 1963 P. R. CASAVINA ET AL 3,081,488
MOLD FORM FOR FABRICATING MODULES
Filed Feb. 17, 1960 2 Sheets-Sheet 1

INVENTORS
PAUL R CASAVINA
JOSEPH R. KITSON
BY

March 19, 1963 P. R. CASAVINA ET AL 3,081,488
MOLD FORM FOR FABRICATING MODULES

Filed Feb. 17, 1960 2 Sheets-Sheet 2

INVENTORS
PAUL R CASAVINA
JOSEPH R. KITSON
BY

United States Patent Office 3,081,488
Patented Mar. 19, 1963

3,081,488
MOLD FORM FOR FABRICATING MODULES
Paul R. Casavina, Ridgewood, N.J., and Joseph R. Kitson, Newington, Conn., assignors to Casavan Industries, Inc., Paterson, N.J., a corporation of New Jersey
Filed Feb. 17, 1960, Ser. No. 9,278
2 Claims. (Cl. 18—5)

This invention relates to an improved module form.

The art is familiar with building modules of predetermined size which are used for construction of curtain walls. Such modules may be large, such as an 8 x 12 foot wall panel, or small, such as a building block. The building modules are faced with material suitable for the application intended separated by an insulation layer, such as foamed plastic. The facings may be supported by a light frame work or may be supported directly by the insulation layer.

In many cases it is desirable that the module be faced with tiles or pieces of sliced marble. In such cases proper positioning of the facing material with respect to the module components and holding the positioning during foaming of the plastic to form a supporting surface bonded to the facing is difficult.

The difficulty of positioning the facing is compounded by the pressures and temperatures encountered during foaming of plastic into an insulating mass.

Plastic pellets, such as polystyrene pellets, are inserted in the module and the pellets are expanded or foamed into a foam-like insulating mass by steam or hot air introduced into the module.

Therefore, it is necessary to clamp the module within a supporting mold during insertion of the steam therein to prevent deformation of the module from the desired outline dimensions. For details of a mold suitable for fabrication of a plurality of modules, reference may be had to application Serial No. 11,943, filed February 5, 1960 for "Method and Apparatus for Making Preformed Building Elements."

In module molds, such as that disclosed in the referenced application, the mold must be loaded and held closed during the steam injection cycle. When the module is assembled within the mold, the waiting time cannot be utilized and is wasted.

Further, when using a facing comprising pieces of material such as tile, the desired orientation of the tile must be preserved during mold loading and steam injection. When the modules are of small size, such as building block size, it is desirable to fill the mold with a plurality of stacked modules. Means for providing the necessary facing support for a stacked plurality of modules are not known to the art.

It is therefore one object of this invention to provide an improved means for module assembly overcoming the disadvantages of the prior art.

It is a further object of this invention to provide a mold form which can be loaded outside the mold and stacked therein for application of steam into the module.

It is a further object of this invention to provide an improved mold form offering economies in fabrication of modules thereby.

It is a still further object of this invention to provide an improved mold for the formation of modules.

In accordance with these objects there is provided, in a preferred embodiment of this invention, a mold form the dimensions of which are determined by the size of the modules to be produced. The bottom wall of the form is provided with at least one aperture through which steam may be introduced into the interior of the form. A nozzle is provided to communicate steam from the aperture into the interior of the module to expand plastic pellets placed therein into the desired foam-like insulating mass. The nozzle is preferably composed of a plastic compatible with the insulating mass and of such composition and thickness as to be melted by the steam after dispersing the steam throughout the form. Alternatively, the nozzle may be fabricated of metal. In either case, the nozzle is loosely coupled to the aperture so as to remain inside the module when removed from the form.

At least one of the walls of the form is hingedly connected to the form so that it may be swung open to provide access to the form for loading of modules and/or the components of the module. The hinged wall is preferably formed with a perforated face plate to which a source of vacuum may be supplied to hold the module surface thereon.

The module is assembled in acordance with this invention by prepositioning the facing material on a backing sheet. The sheet is positioned on the face plate and held in the desired position by vacuum applied to the perforations therein. The module components and plastic pellets are loaded in the form and the form closed. The form may be stacked in the mold and steam admitted to the modules to foam the plastic pellets into an insulating mass. During the steam cycling, other forms may be loaded preparatory to stacking thereof in the mold as the completed modules are withdrawn. Thus, the production rate of the mold is increased. The module may then be finished, as for example by applying grout to the facing.

This invention may be more easily understood by reference to the following description taken in combination with the accompanying drawings of which:

Figure 1:
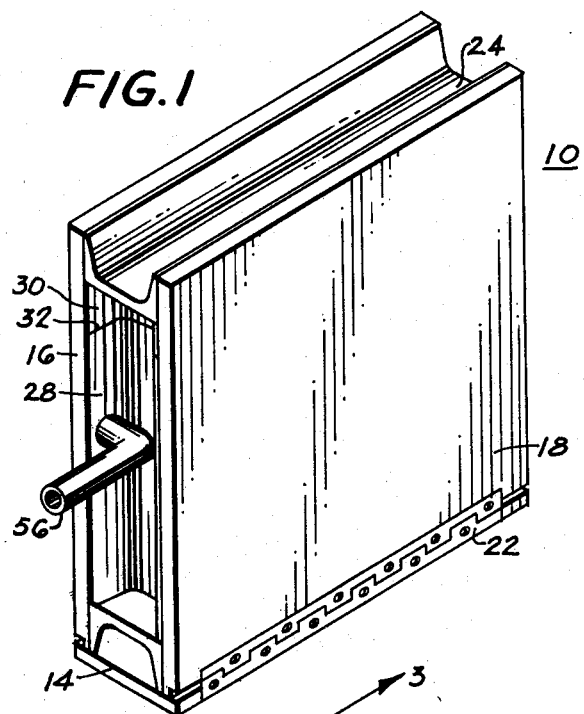
FIGURE 1 is a perspective view of a form in accordance with this invention.
Figure 2:
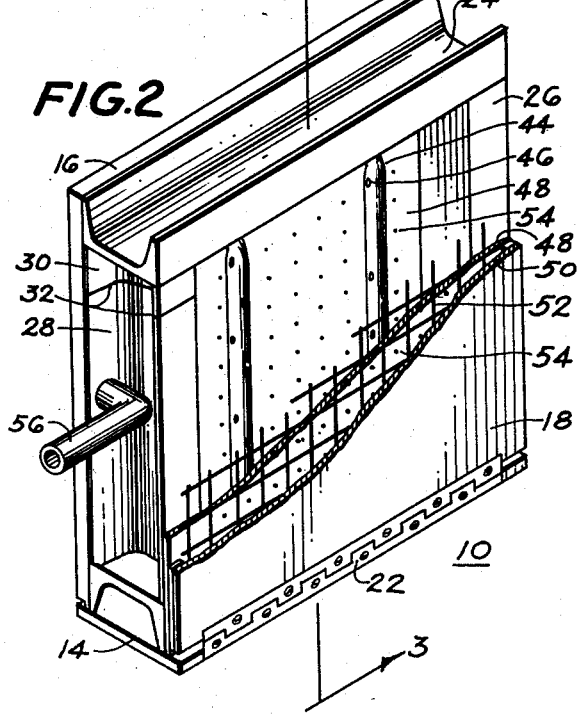
FIGURE 2 is a partially sectioned perspective view of the mold form shown in FIGURE 1.
Figure 3:
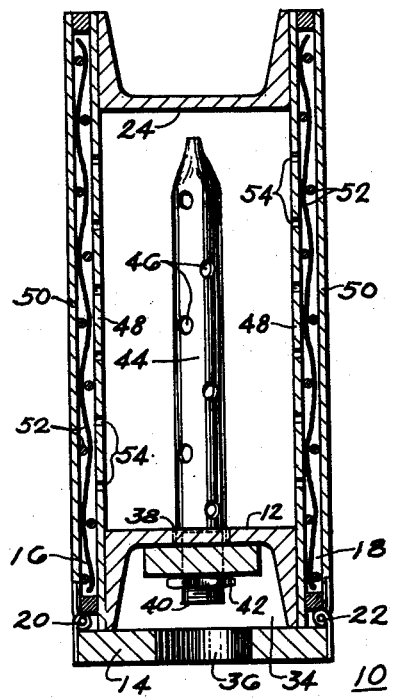
FIGURE 3 is a section view taken along lines 3—3 of FIGURE 2.

Referring to FIGURES 1–4 there is shown a mold form 10 comprising a bottom wall 12 mounted on a base plate 14. Side walls 16 and 18 are coupled to the base plate by means of longitudinally extending hinges 20 and 22 respectively.

The top wall 24 is secured to one of the side walls. One end wall 26 is secured to the side wall 18 with the other end wall 28 being secured to the side wall 16. In order to provide smooth end wall surfaces, the end wall is preferably segmented such as by splitting the end wall into section 28 and section 30 secured to opposing side walls and provided with a mating curved surface 32 which will meet to form a continuous end wall when the side walls are closed on the mold.

The walls are preferably formed of aluminum to lend lightness to the form with the strength requisite for the pressures and temperatures encountered in operation.

A chamber 34 is defined by the base plate and the bottom wall 14 and 12 respectively. The base plate is provided with apertures 36 into which a nozzle from a steam header may be inserted for application of steam to the module component. The bottom wall is provided with at least one aperture 38 having a threaded pipe 40 engaged therewith and locked into position by the overlying nut 42. A nozzle 44 may be slipped over pipe 40. The nozzle is provided with a plurality of apertures 46 to disperse the steam introduced into the chamber 34 within the module form to expand insulating pellets placed therein into a foam-like insulating mass. Exemplary of the type of insulation found desirable is the expansion of polystyrene pellets into a foamed mass.

The nozzles 46 are preferably formed of a plastic material compatible with that of the plastic forming the insulation. The nozzle is fabricated of plastic and of thickness such that it will disperse the steam for the suitable cycle to expand the insulator pellets and be melted by the steam to disperse the nozzle within the insulating mass leaving no noticeable voids therein. Thus, the module may be removed from the mold without consideration of nozzle location.

Alternatively, the nozzles may be formed of thin metal removably coupled to the pipe 40. When the module is removed from the form, the nozzles remain in the module and can be filled with grout for structural strength.

Each of the side walls comprises a face plate 48 spaced apart from a backing plate 50 by wire mesh 52 therebetween. The wire mesh offers lateral support between the face plate and the backing plate without interfering with the path between the perforations 54 in the face plate and the pipe 56 communicating with the chamber formed between the face and backing plates. A source of vacuum may be coupled to pipe 56 which is then distributed to the respective perforations in the face plate. In this manner, for example, the material to form the surface of the module may be simply placed on the perforated wall and will be held thereto by the vacuum.

Figure 5:
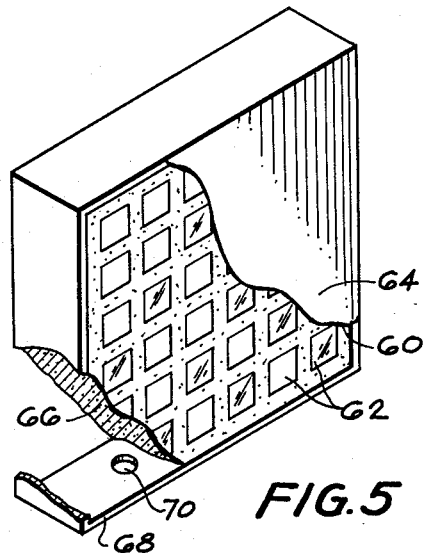
FIGURE 5 is a partially sectioned perspective view of a module prepared by the method of this invention.
Figure 4:
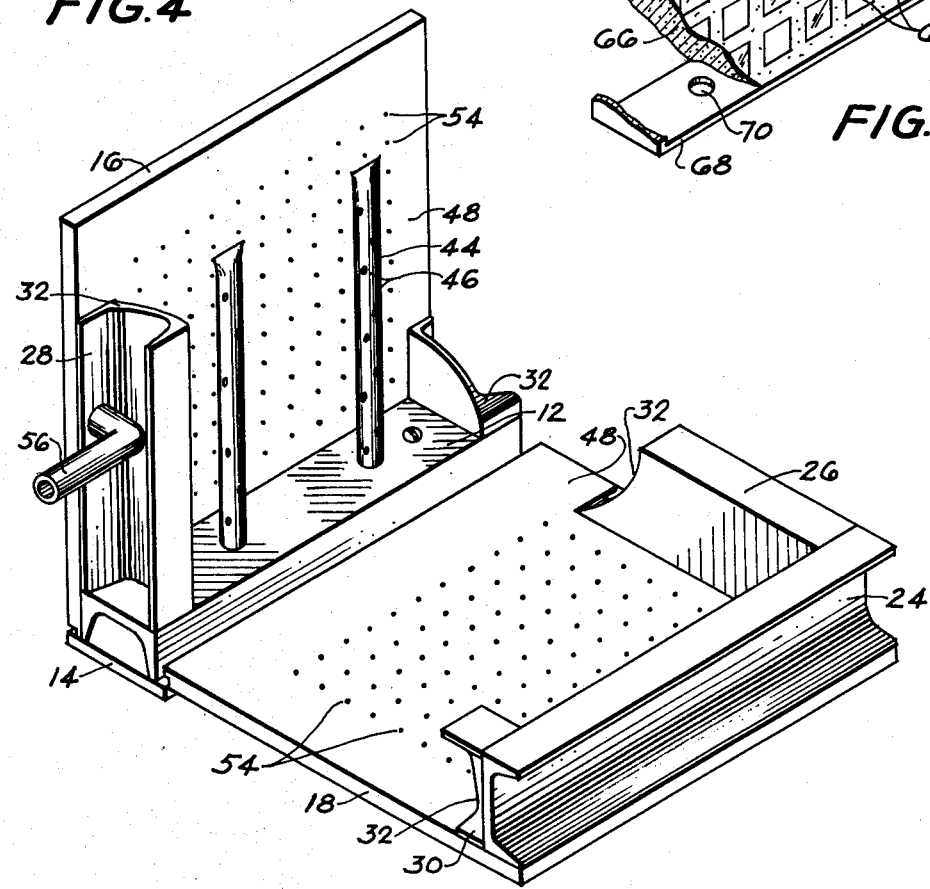
FIGURE 4 is a perspective view showing the mold form when open.

The operation of the form and the method of assembly of a module is best understood by reference to FIGURE 5 in combination with the other figures.

In FIGURE 5 there is shown a module having a facing 60 comprising a plurality of tiles 62 prepositioned on a backing sheet 64 such as kraft paper stock. The facing is bonded to the insulation 66 of foamed styrene and positioned thereby with a thin frame 68 such as a thin aluminum frame. The frame is provided with apertures 70 for introduction of steam or hot air therein during the foaming of the insulation.

To fabricate the module, the form is opened and the frame inserted therein with the nozzles extending through the apertures 70. The nozzles may be coupled to the pipe 40 after insertion of the frame for convenience. Plastic pellets are inserted in the frame.

The facing is then positioned on the side wall 48 and held thereto by vacuum applied to pipe 56.

When the facing comprises a plurality of pieces, such as tiles, the pieces are arranged in the desired pattern and bonded to a backing sheet such as kraft paper. The facing is then placed on the side wall and held in position by vacuum.

The form walls are then closed, the forms stacked in a mold, and steam introduced into the modules to foam the plastic.

The forms may then be removed and the modules extracted. The modules may then be finished by applying grout to the spaces between tiles. Grout may also be poured into the nozzle spaces if a nozzle which is not melted by steam is employed.

It will be noted that during the cycling when the forms are within the mold and steam introduced therein additional modules may be prepared in the forms ready for stacking the molds. By such operation, the mold is operating more economically and a higher production can be achieved within each mold.

While the building module has been described in terms of styrene beads heated by steam to form a foam, it is to be understood that other foaming compositions, such as the urethane type foams, which set for form a firm mass may be used. Thus, where the urethane resistants are in liquid or motion form, measured amounts are injected into the assemble and react to fill the module completely.

This invention may be variously modified and embodied within the scope of the subjoined claims.

What is claimed is:

1. A module form for modules formed by the expansion of pellets into an insulating mass by the application of steam thereto comprising a bottom wall, side walls hingedly connected thereto, an end wall carried by each of said side walls, a top wall carried by one of said side walls, said side walls being movable from an open position to a closed position defining an enclosing module form, said bottom wall being provided with at least one aperture for the admission of steam therein, and a nozzle coupled to said aperture for the distribution of steam throughout the interior of said form, said nozzle being composed of thermoplastic material having a wall thickness to distribute said steam throughout said module form for expansion of said pellets and to be melted by said steam during the distribution of said steam so that the nozzle will be substantially completely melted when said pellets are expanded into an insulating mass.

2. A form according to claim 1 in which said side walls comprise a perforated face plate and means for applying a vacuum to each of said perforations.

References Cited in the file of this patent

UNITED STATES PATENTS

| | | |
|---|---|---|
| 884,965 | Walker | Apr. 14, 1908 |
| 937,105 | Simons | Oct. 19, 1909 |
| 2,017,216 | Marcus | Oct. 15, 1935 |
| 2,255,438 | Robinson | Sept. 9, 1941 |
| 2,611,926 | Grannis | Sept. 30, 1952 |
| 2,744,042 | Pace | May 1, 1956 |
| 2,762,739 | Weiss | Sept. 11, 1956 |
| 2,771,320 | Korwin | Nov. 20, 1956 |
| 2,814,529 | Arnt | Nov. 26, 1957 |
| 2,948,926 | Kuhn | Aug. 16, 1960 |
| 2,949,689 | Uida | Aug. 23, 1960 |
| 2,983,963 | Jodell et al. | May 16, 1961 |

FOREIGN PATENTS

| | | |
|---|---|---|
| 569,925 | Canada | Feb. 3, 1959 |
| 333,621 | Switzerland | Apr. 30, 1959 |

OTHER REFERENCES

Koppers booklet, dylite-expandable-polystyrene, 1954, pages 10, 11 and 21.